United States Patent
Kontothanassis et al.

(10) Patent No.: US 6,341,339 B1
(45) Date of Patent: Jan. 22, 2002

(54) APPARATUS AND METHOD FOR MAINTAINING DATA COHERENCE WITHIN A CLUSTER OF SYMMETRIC MULTIPROCESSORS

(75) Inventors: Leonidas Kontothanassis, Belmont, MA (US); Michael L. Scott, Rochester, NY (US); Robert Stets, Rochester, NY (US); Sandhya Dwarkadas, Rochester, NY (US); Nikos Hardavellas, Belmont, MA (US); Galen Hunt, Bellevue, WA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/048,232

(22) Filed: Mar. 26, 1998

(51) Int. Cl.⁷ .......................... G06F 12/00; G06F 17/30; G06F 15/16; G06F 1/12
(52) U.S. Cl. ....................... 711/148; 711/147; 709/400; 709/201; 707/201
(58) Field of Search .................. 711/141, 117, 711/112, 113, 114, 147, 148; 709/203, 201, 202, 216, 217, 400; 707/201, 203, 204, 202

(56) References Cited

U.S. PATENT DOCUMENTS

| | | | |
|---|---|---|---|
| 5,394,555 A | * 2/1995 | Hunter et al. | 395/800 |
| 5,627,961 A | * 5/1997 | Sharman | 395/182.04 |
| 5,680,542 A | * 10/1997 | Mulchandani et al. | 395/183.04 |
| 5,729,735 A | * 3/1998 | Meyering | 395/610 |
| 5,778,389 A | * 7/1998 | Pruett et al. | 707/204 |
| 5,787,262 A | * 7/1998 | Shakib et al. | 395/200.35 |
| 5,794,253 A | * 8/1998 | Norin et al. | 707/203 |
| 5,802,062 A | * 9/1998 | Gehani et al. | 370/465 |
| 5,806,075 A | * 9/1998 | Jain et al. | 707/201 |
| 5,931,904 A | * 8/1999 | Banga et al. | 709/217 |
| 5,991,760 A | * 11/1999 | Gauvin et al. | 707/10 |
| 6,061,686 A | * 5/2000 | Gauvin et al. | 707/10 |

* cited by examiner

Primary Examiner—Hiep T. Nguyen
Assistant Examiner—Kimberley McLean
(74) Attorney, Agent, or Firm—Leah Sherry Oppenheimer, Wolff & Donnelly LLP

(57) ABSTRACT

The present invention discloses an apparatus and method for maintaining the coherence of data within a shared memory network including a plurality of nodes. The system utilizes processors monitoring the occurrence of particular processing events within a local memory storage area. Upon the detection of events indicating the change of status of a particular group of data, a comparison is made between a modified copy of the group of data and a clean copy of the group of data to detect any modifications made to the group of data. These modifications are entered into the clean copy of the group of data and processing continues.

13 Claims, 6 Drawing Sheets

APPARATUS AND METHOD FOR MAINTAINING DATA COHERENCE WITHIN A CLUSTER OF SYMMETRIC MULTIPROCESSORS

BACKGROUND OF THE INVENTION

1. Technical Field of the Invention

The present invention pertains in general to shared memory network architectures, and more particularly, to an improved technique for shared memory between multiple nodes within a network of symmetrical processors.

2. Description of Related Art

For large scale parallel processing applications employing a shared memory programming model, maximum performance is typically obtained on a multiprocessor by implementing hardware cache-coherence. Large cache-coherent machines having more processors than can fit on a single bus have historically been expensive to implement due to the need for special purpose cache controllers, directories and network interfaces. As a result, many researchers have explored software cache-coherence techniques, often based on virtual memory, to support a shared memory programming model on a network of commodity machines. In the past, however, such Software Distributed Shared Memory (SDSM) systems have not provided sufficient performance to cost ratios to make them an attractive alternative to high end hardware.

Recent technological advances have produced inexpensive local area networks which allow processors in one node to modify the memory of other nodes safely from the user space with very low latency. Furthermore, small and medium scale symmetric multiprocessors are becoming commodity items and are receiving a growing acceptance for their use as database and web servers, multi-media work stations, etc. Given economies of scale, a networked system of small symmetric multiprocessors on a low latency network is becoming a highly attractive platform for large shared memory parallel programs. Symmetric multiprocessor nodes reduce the number of coherence operations which must be handled in software while low latency networks reduce the time which programs must wait for those operations to complete.

Although software shared memory has been an active area of research for many years it is only recently that protocols for such clustered systems have begun to develop. The challenge for such a system is to reconcile hardware implemented coherence of symmetric multiprocessor nodes with software implemented coherence among the nodes. Such reconciliation requires that each processor in a node in the networked system be synchronized each time one of the nodes exchanges coherence information with another node.

SUMMARY OF THE INVENTION

The present invention overcomes the foregoing and other problems with a method and apparatus for maintaining coherent data between nodes of a symmetric multiprocessor (SMP) cluster. Each node within the network contains local memory which includes a working copy storage area for storing copies of groups of data on which processing operations are directly carried out. A twin copy storage area stores twin copies of the groups of data within the working copy storage area. The twin copies are only updated at selected periods and comprise the state of the particular group of data prior to the most recent local modifications of the data. Finally, a home node storage area within the local memory stores home node copies of groups of data. There only exists a single home node copy of each group of data within the entire shared memory network. The home node copies are utilized for gathering changes to a group of data which may be made at multiple nodes within the network. It should be noted that the home nodes and working copy storage areas are preferably the same areas. Nodes will not create working copies of pages for which the node serves as the home node.

Processors associated with the node in the local memory monitor operations generated in response to a controlling program that affects the status of the various groups of data and their copies throughout the network. Upon detection of particular types of events that alter the status of a group of data, modifications to the working, twin and home node copies of a group of data may be implemented. For example, the initiation of a fetch operation of a home node copy of a group of data from a remote node location is one such operation. Upon detection of a fetch operation, a comparison is made between a fetched home node copy of the particular group of data and the twin copy of the group of data stored within the local node. The comparison detects modifications that have been updated within the home node copy that are not presently reflected by the twin copy. These changes are written into both the twin copy of the group of data and the working copy of the group of data at the local node such that the copies being processed by the local node contain all current information.

Another status change which may initiate operation of the updates of stored copies involves detection of a page fault operation for a working copy of a particular group of data. In this situation, the working copy of the group of data to which the write operation has been directed is compared with the twin copy of the group of data stored at the same node to detect any modifications made to the particular group of data since the last update operation of the twin copy. Differences detected by this comparison are noted and entered into the existing twin copy. The differences detected by the comparison are also written to the home node copy of the group of data to ensure that all copies are sufficiently updated.

Prior to any comparisons by the processor controlling the above-described operations, an initial determination may be made to find out whether the home node copy has been modified since the detected change in status. This is accomplished by comparing a time stamp of the most recent write operation of the twin copy of the group of data to a time stamp of the most recent fetch operation of the twin copy of the group of data. If the write operation occurred more recently then the fetch operation, modifications exist which have not been updated to the twin copy and updating is necessary. Each group of data within the system includes time stamps indicating the last occurrence of a write or fetch operation to enable these comparisons.

OBJECTS OF THE INVENTION

Accordingly, it is an object of the present invention to provide a software coherent shared memory system for a network of symmetric multiprocessors.

It is also an object of the present invention that such a software coherent shared memory system be highly asynchronous requiring no global directory locks or intra-node TLB shootdowns.

Yet another object of the present invention is that such a software coherent shared memory system will maintain twin copies of modified pages to reflect prior updates previous to any present modifications.

It is still further an object of the present invention to provide further advantages and features, which will become apparent to those skilled in the art from the disclosure, including the preferred embodiment, which shall be described below.

In yet another object a software, coherent shared memory system will minimize overhead incurred by data transfer, directory accesses, locking, and other protocol operations.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
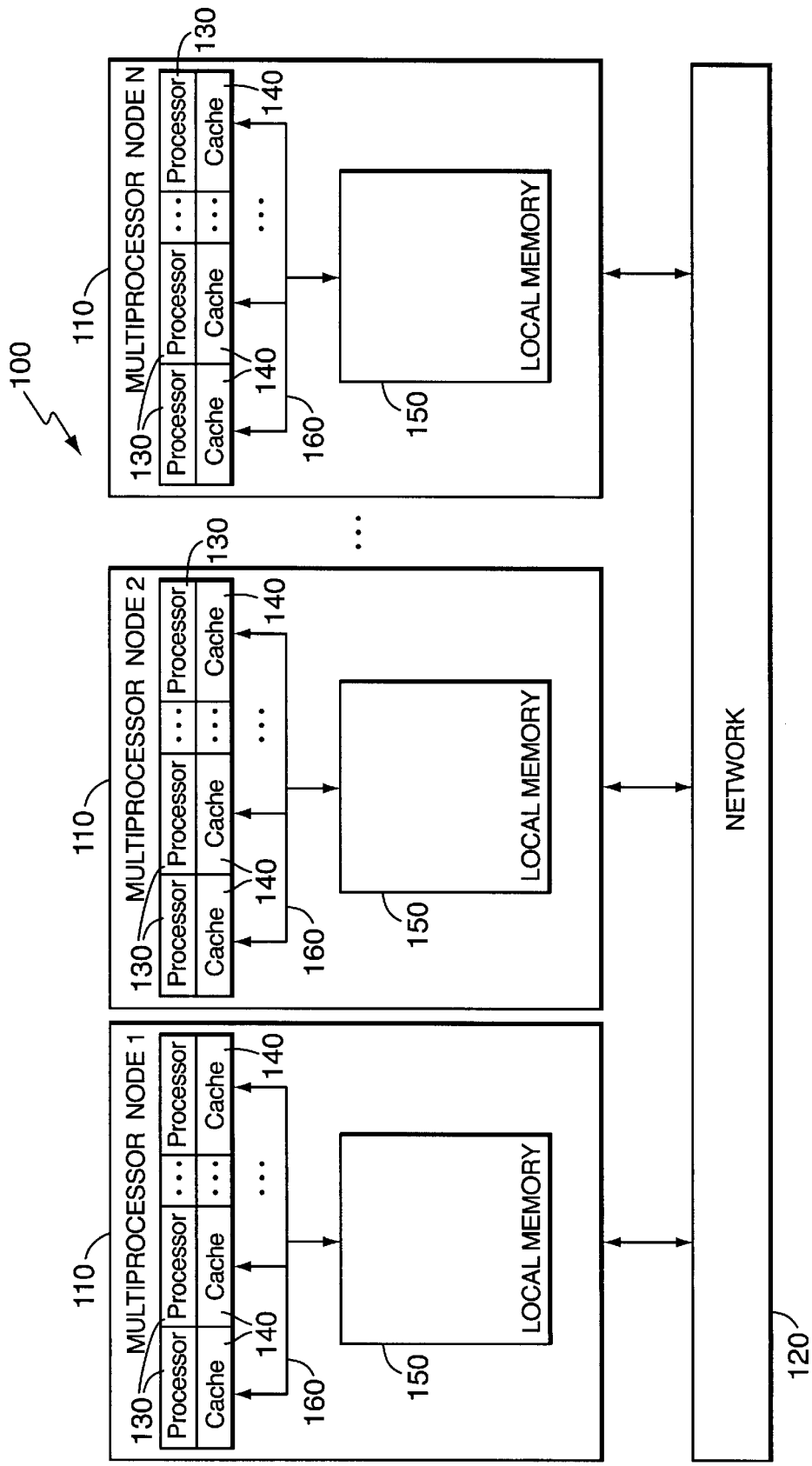
FIG. 1 illustrates a functional block diagram of a multi-node network of symmetric multiprocessors in which an embodiment of the present invention is operable.

Referring now to the drawings, and more particularly to FIG. 1, a multinode network is shown generally at 100. The network 100 comprises a plurality of nodes 110 communicating with each other via a communication network 120. The communication network 120 preferably comprises a high speed low latency network, but may comprise any type of network enabling communications between the nodes 110. Each node 110 includes a plurality of processors 130 associated with a plurality of cache memories 140 and a local memory 150. The plurality of processors 130 of a given node 110 communicate with the local memory 150 via a communication bus 160. The local memory 150 of each of the respective nodes 110 is shared by the plurality of processors 130 of the respective nodes 110 by implementing hardware coherency techniques commonly known in the industry.

Figure 2:
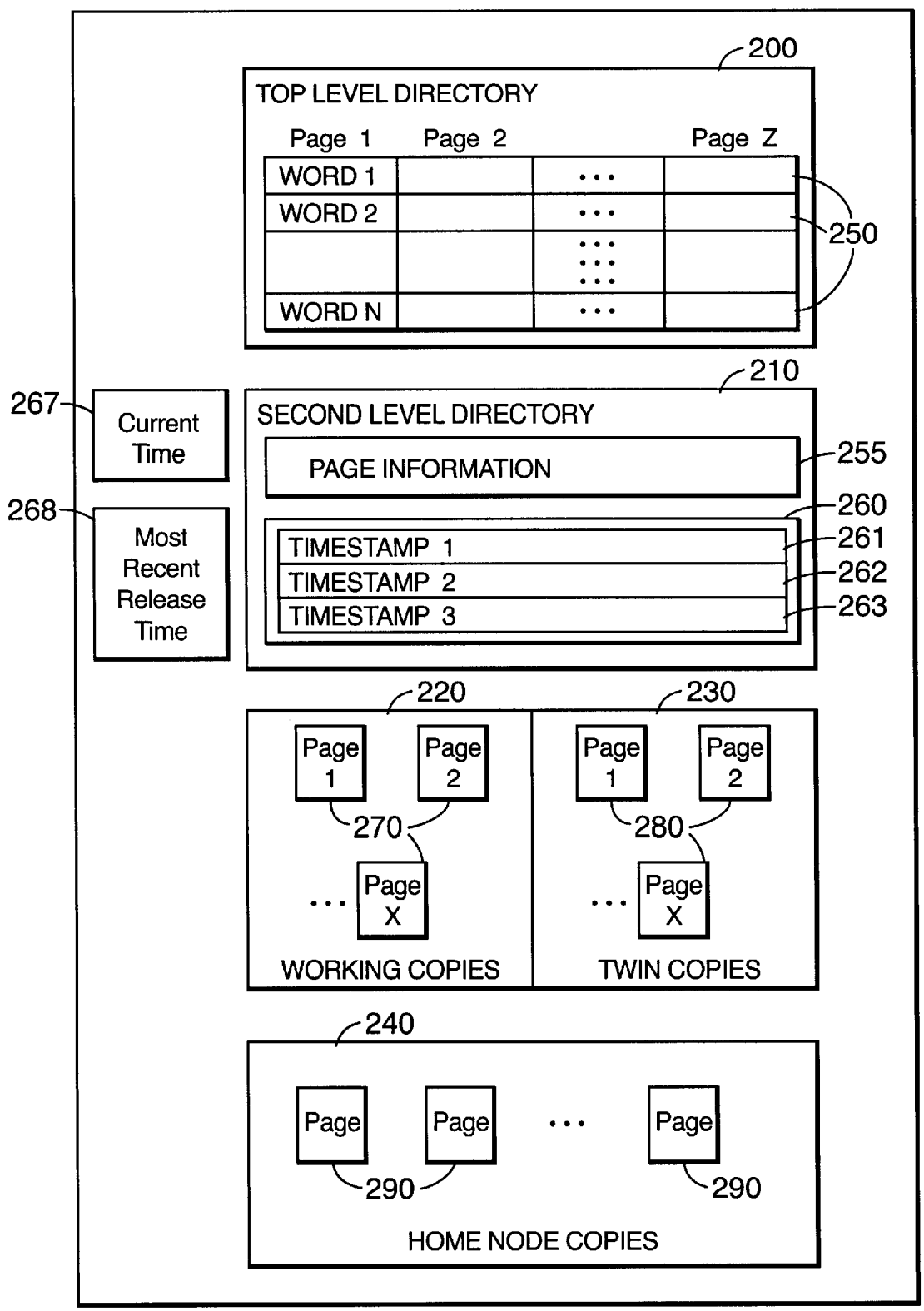
FIG. 2 illustrates a functional block diagram of a local memory of a symmetric multiprocessor node of the multi-node network in FIG. 1 shown in greater detail.

Referring now also to FIG. 2, there is illustrated a functional block diagram of a local memory 150 associated with a node 110. The local memory 150 includes a top level directory 200, a second level directory 210, a working copy storage area 220, a twin copy storage area 230 and a home node page storage area 240. The working copy storage area 220, twin copy storage area 230 and home node page storage area 240 store pages of data accessible by each of the nodes 110. A page comprises a unit grouping of data accessible by a node 110.

The working copy storage area 220 of the local memory 150 stores working copies 270 of pages currently being accessed by the processors 130 of a particular node 110. The working copies 270 may be modified by the processors 130 during write operations. The twin copy storage area 230 contains pages comprising twin copies 280 of working copies 270 of pages currently located in the working copy storage area 220. The twin copies 280 are not created until an associated working copy 270 is modified by a processor 130. The twin copies 280 are not modified by the processors 130 on an ongoing basis but are duplicate copies of the working copies 270 made prior to any modifications or updates by the processors 130 of the working copies.

The home node page storage area 240 of the local memory 150 contains home node copies 290 of pages. A home node copy 290 of a page comprises the master copy of a page to which all modifications must eventually be made. There is only one home node copy 290 for each page, and a home node copy may be stored within a home node page storage area 240 of any node 110. Thus, the total contents of the home node page storage area 240 for each node 110 comprises all of the pages which may be accessed by the network 100. Each node 110 may have a home node page storage area 240 containing any number of home node copies 290 of pages up to the total number of existing pages.

To keep track of which nodes 110 have working copies 270, twin copies 280 and home node copies 290 of pages, the present invention, maintains a distributed directory structure. The top level (inter-node) directory 200 represents each page by N thirty two bit words 250 where N is the number of nodes 110 in the network 100. Thus, the directory 200 has data on each copy of a page stored within the network 100. The word 250 for a given page on a given node 110 contains the page's loosest permission (highest ability to access the page) on any processor 130 located in the node 110, the identification of a home processor 130 that initially accessed the page and consequently the home node of the page, and the identification of any processor 130 accessing the page in exclusive mode. Exclusive mode occurs when only a single node has a copy of and access to a page. Since a single word 250 represents each node 110, distributed locks are avoided and synchronization overhead is reduced.

The second level directory 210 contains page information identifying which processors 130 have invalid, read only and read/write mappings of a page. The second level directory 210 also includes a set of time stamps 260 for each page. A first time stamp 261 identifies a completion time of the last flush operation for a page. A second time stamp 262 identifies a completion time of the last update or fetch operation for a page, and a third time stamp 263 identifies the time the most recent write notice was received for a page. This information is repeated for each page stored on the node.

To avoid the need to update remote time stamps when transmitting write notices which would require global locks on processed pages, the processors 130 check to see if any write notices have arrived and time stamps them at that point. Thus, although the processor 130 does not know the precise time that the write notice arrived, it is assured that the write notice arrived no later than the time contained in the third time stamp 263. In addition to the set of time stamps 260 for each page, each node 110 maintains the current time 267 and the time of the most recent release 268 by any processor 130. The current time 267 is incremented every time an acquire or release operation begins, every time local changes are made to the home node copies 290 or vice versa, or whenever a arrival of a write notice is detected.

The present invention uses currently available hardware implemented coherence techniques within each of the nodes 110 to enable all processors 130 in a given node to have access to the same shared data and share physical pages of the working copy storage area 220, the twin copy storage area 230 and the home node page storage area 240 via the communication bus 160. Across nodes 110, the present invention uses software enabled by virtual memory protection to implement coherence for page-size blocks. Shared pages are copied from the home node to the nodes 110 that are currently reading or writing them. Multiple processors 130 within the nodes 110 may have a write mapping for a page with writeable copies existing on multiple nodes 110. Programs operating on the present invention adhere to a data-race-free programming model in which all accesses to shared pages are protected by locks and barriers.

The working copies 270 contain all local modifications made by the processors 130 within a given respective node 110. The local memory 150 also contains twin copies 280 for each of the working copies 270 residing in the particular local memory 150. The present invention uses the twin copies 280 to collect page modifications. A twin copy 280 is maintained whenever at least one local processor 130 has write permission for a page and the page is not accessed exclusively by the local node 110. Twin copies 280 are not initially created with the working copies 270 but are created once the working copy 270 is first modified. The twin copies 280 are modified by the processors 130 of the particular node 110 in which they reside.

Figure 3:
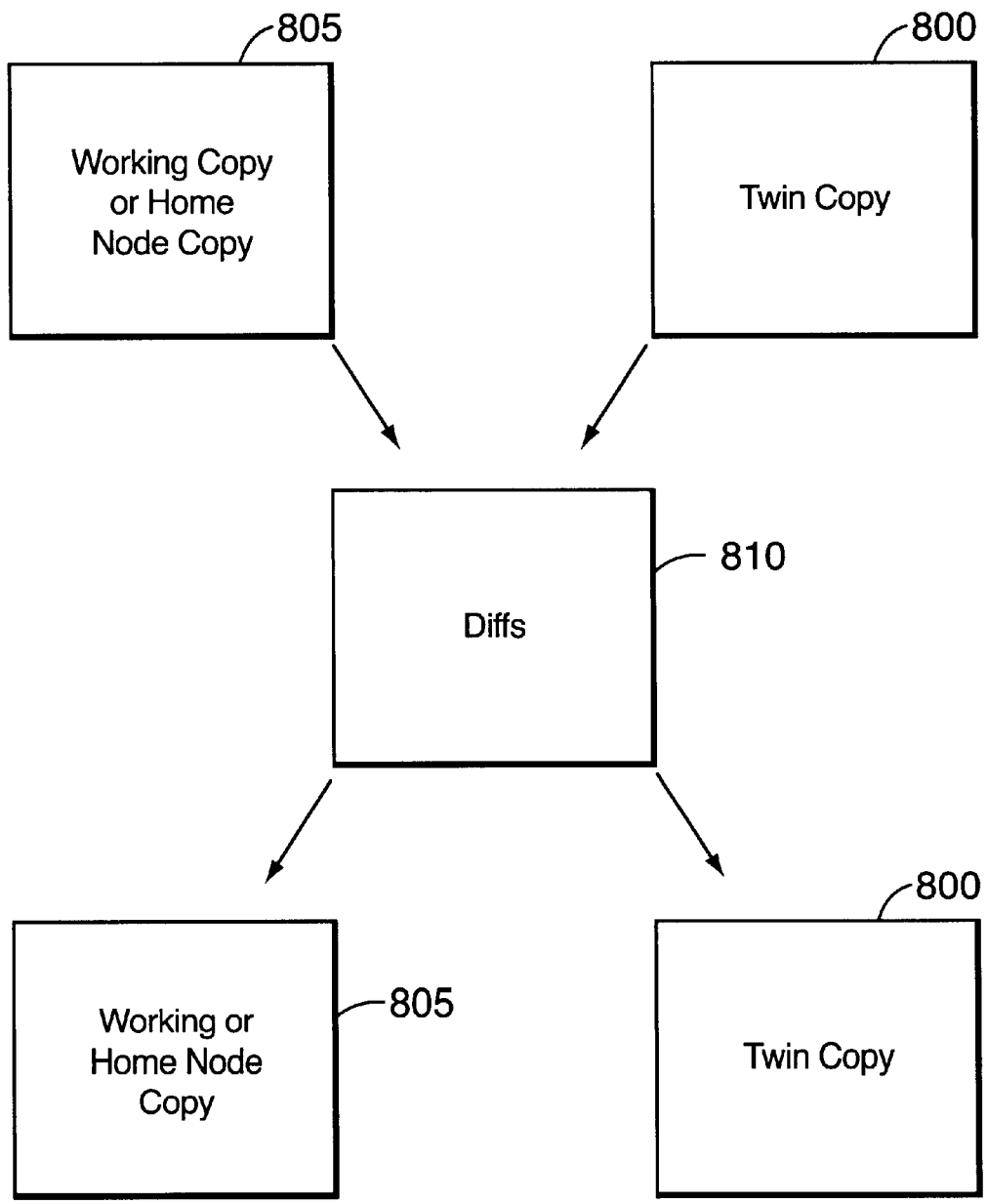
FIG. 3 illustrates a diffing operation between copies of a page.

A processor 130 can determine which words of a page have been modified by comparing the twin copy 280 of the page to the working copy 270 for local writes and by comparing the twin copy 280 to the home node copy 290 for remote writes as generally illustrated in FIG. 3. This comparison is referred to as "diffing" and produces "diffs" or differences between the two copies. In the present invention diffing is performed on both outgoing and incoming operations and is accomplished by performing an exclusive-or operation at a bit level. This process is more fully illustrated in FIG. 3, wherein there is illustrated a twin copy 800 and a second copy 805 which may comprise either a working copy in the case of a local write or a home node copy in the case of a remote write. These two copies are compared using the diffing operation to generate a listing of diffs 810 illustrating the differences between the two copies. The diffs 810 are applied to both the twin copy 280 and the working copy 270 such that a correctly updated version of the page is available. The diffs are written to the twin copy in the case of either a local or remote write operation.

Figure 4:
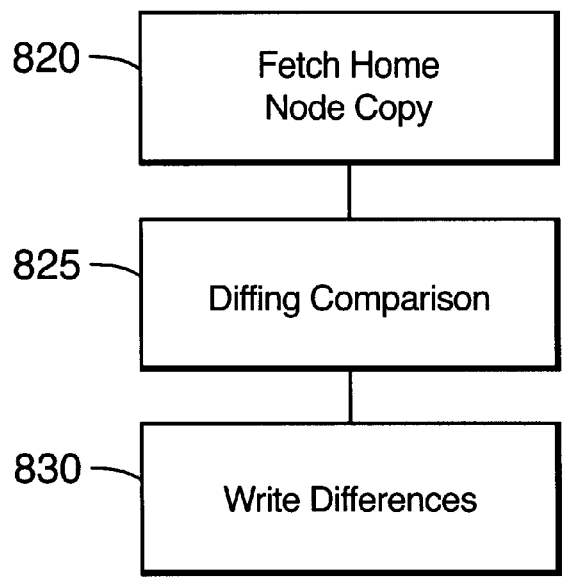
FIG. 4 is a flow diagram illustrating a method for updating a working and twin copy from a home node copy.

Referring now to FIG. 4, there is illustrated a flow diagram of the method for updating a working and twin copies of a page from a home node page. A fetch operation of a page initiates the need to update the working and twin copies of the page. Performing an incoming comparison between the home node copy 290 and the twin copy 280 eliminates the need to perform a TLB shootdown and allows multiple concurrent writers to continue in parallel with a page update operation. After fetching at step 820 a current copy of the page from the home node copy 290, the differences between the twin copy 280 and the home node copy 290 are determined at step 825 using a diffing operation. The differences between the home node copy 290 and the twin copy 280 are written at step 830 into both the working copy 270 and the twin copy 280. The differences are modifications that have been made on the page at other nodes 110 and that need to be updated locally. Updating the twin copy 280 is necessary so that future flushes of the same page do not attempt to update already updated portions of the page which might inadvertently overwrite more recent remote modifications and also to make sure that future fetches do not overwrite local modifications.

Figure 5:
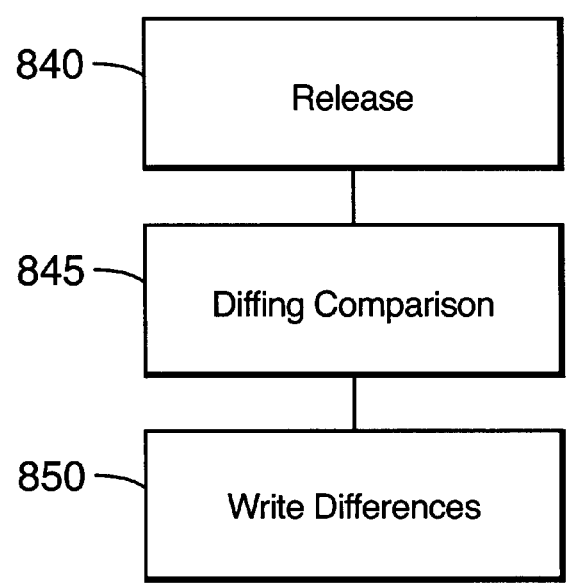
FIG. 5 is a flow diagram illustrating a method for updating the twin and home copies of a page in response to changes to the working copy.

Referring now to FIG. 5, there is illustrated a flow diagram of the method of updating a twin 280 and home 290 copies of a page in response to changes made to working copies 270 of a page. The updating of the twin and home copies are initiated by a flush of the working copy. Upon initiation of a working page flush operation at step 840, a diffing operation is performed at step 845 between the working and twin copies of the affected page. Any detected working copy 270 modifications (diffs) are written at step 850 to both the home node copy 290 and to the twin copy 280 of the page. Subsequent release operations within the node 110 are assured that the modifications to the working copy 270 have already been flushed which avoids overwriting more recent modifications to the home node copy 290 by other nodes 110.

Figure 6:
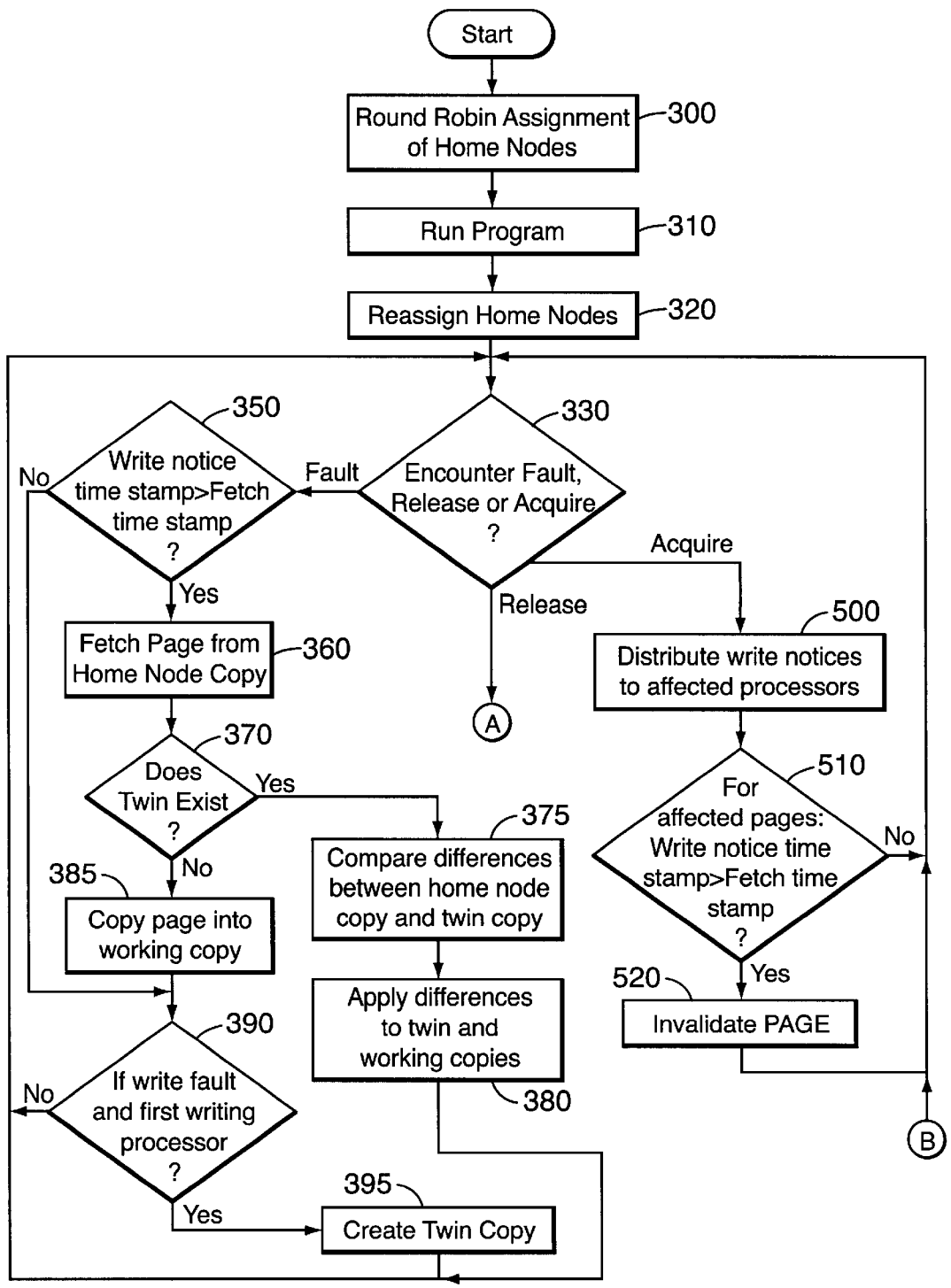
FIGS. 6 and 7 illustrate a method flow diagram listing the method steps of a method of operation of an embodiment of the present invention.
Figure 7:
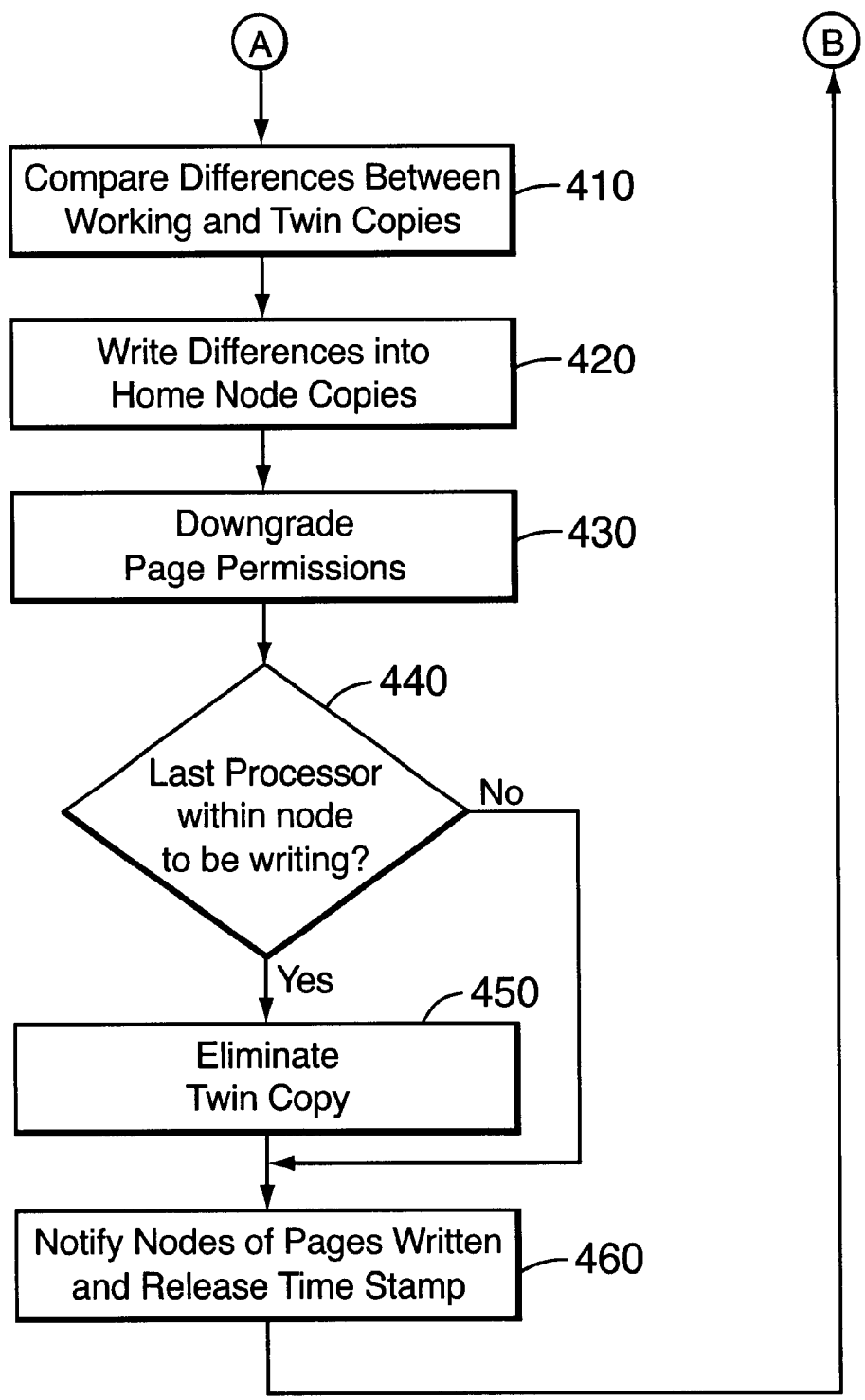

Referring now to FIGS. 6 and 7, there is illustrated a flow diagram describing the implementation of the present invention in response to various processing instructions from a processor 130. Home node copies of the pages are initially assigned to home node copy storage areas 240 located in local memories 150 of nodes 110 in a round robin fashion at step 300. A program, which may be a program to perform any type of data processing functionality, is run at step 310 by the processors 130. As processors 130 access home node copies of pages in response to execution of the program, the home node page copies 290 are reassigned at step 320 to the local memory 150 of the node 110 where the accessing processor resides.

As the program executes, fault operations, release operations and acquire operations are generated. A fault operation comprises either a read or a write access of a page by a processor 130 that is not associated with a home node of the page. A release operation involves notifying all processors that changes have been made to a page such that the other processors know their copy of the page is out of date. A release operation further involves placing the changes in the home node copy of the changed page such that the changes may be accessed by other processors. An acquire operation involves collecting all the changes to a page and discarding old copies not reflecting these changes.

Inquiry step 330 monitors for the execution by a processor 130 of a fault, release or acquire operation. If a fault operation is executed by a processor 130, the faulting processor 130 compares the write notice time stamp of the page being accessed to the fetch time stamp 262 for the page at step 350 to determine if the write time stamp 263 is greater than the fetch time stamp. This indicates that changes have been made to the page after the last fetch operation. If the write notice time stamp 263 is not greater than the fetch time stamp 262 (i.e., no recent changes have been made), control moves to inquiry step 390 as will be further described below. Otherwise, the faulting processor 130 fetches at step 360 the recently changed page from the home node copy 290 of the page in the home node.

Inquiry step 370 determines whether a twin copy 280 of the fetched page exists within accessing node 110. If a twin copy 280 exists, the faulting processor 130 determines at step 375 the differences between the fetched home node copy 290 and the twin copy 280 of the page and applies the differences at step 380 to both the twin copy 280 and the working copy 270. Control then returns to inquiry step 330. If inquiry step 370 determines that a twin copy 280 of the page does not exist, the faulting processor 130 copies at step 385 the home node copy 290 of the page as the working copy 270 of the page. Inquiry step 390 determines whether the detected fault operation was a write fault and if the faulting processor is the first processor writing to the page. If both conditions are true, a twin copy 280 of the page is created at step 395 and control returns to Inquiry step 330. Otherwise, control merely returns to step 330.

If a release operation by a processor 130 is detected at step 330, the releasing processor 130 determines at step 410 the differences between the working copies 270 of a page and the twin copies 280 of a page and writes at step 420 the differences into the home node copy of the page. This flushes all modified non-exclusive pages to the home node copy. In order to trap future modifications to the page, the releasing processor 130 downgrades page permissions for the page at step 430. Inquiry step 440 determines whether the releasing processor 130 is the last processor within the node to have performed a write operation to the page. If so, the twin copy 280 is eliminated at step 450. Following elimination of the twin copy at step 450, or if inquiry step 440 determines that the processor 130 was not the last processor to perform at write operation on the page, the releasing processor 130 notifies at step 460 other processors of the write operation to the page and the release time stamp. Control then returns to step 330.

If an acquire operation is detected at Step 330, write notices are distributed at step 500 to processors containing copies of the changed page. As the write notices are detected by the processor containing copies of the changed page, the most recent write notice time stamp for the page is updated at step 505 with the arrival time stamp of the write notice in the second level directory 210 of the local memory 150 associated with the affected processor. After distributing the write notices, the affected processor 130 processes the write notices for each affected page. The affected processor 130 compares at step 510 the most recent write notice time stamp with the last fetch time stamp to determine which is greater. If the most recent write notice time stamp is greater than the last fetch time stamp, the acquiring processor 130 invalidates the page at step 520, and a return is made to step 330. Otherwise, the affected processor 130 does nothing and a return to step 330 since no changes have been made to the page since the last fetch operation.

Although a preferred embodiment of the method and The apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for maintaining coherence of data within a shared memory network, comprising the steps of:
   providing a home node copy of a group of data at a first electronic node, the home node copy representing a master copy of the group of data generated at the first electronic node;
   storing a working copy of at least a first portion of the master copy at a second electronic node;
   storing a twin copy of the working copy at the second electronic node;
   fetching the master copy from the first electronic node;
   determining a difference between the fetched master and the twin copy;
   writing the determined difference to the working copy; and
   writing the determined difference to the twin copy.

2. The method of claim 1, further comprising the step of:
   detecting initiation of a fetch operation of the home node copy of the group of data.

3. The method of claim 2, further comprising the step of:
   modifying the working copy of data;
   wherein the step of storing the twin copy includes the step of storing the twin copy responsive to the step of modifying the working copy.

4. The method of claim 1, wherein the difference determination step further comprises the step of comparing the home node copy to the twin copy using an exclusive OR operation at the bit level.

5. An article of manufacture, comprising:
   a processor readable storage medium having processor programming stored thereon for maintaining coherence of data within a shared memory network including a plurality of processors, wherein said processor programming is configured to be readable from at least one of said plurality of processors causing said at least one processor to:
   fetch a master copy of data from a first electronic node;
   store a working copy of the master copy of data at a second electronic node;
   store a twin copy of the working copy the second electronic node;
   determine a difference between the fetched master copy and the stored twin copy;
   write the determined difference to the working copy; and write the determined difference to the twin copy.

6. The article of manufacture of claim 5, wherein the processor programming is further configured to cause said processor to:
   detect initiation of a fetch operation of the master copy of data.

7. An article of manufacture, comprising:
   a processor readable storage medium having processor programming stored thereon for maintaining coherence of data within a shared memory network including a plurality of processors, wherein said processor programming is configured to be readable from at least one of said plurality of processors causing said at least one processor to:
   fetch a master copy of data from a first electronic node;
   detect initiation of a fetch operation of the master copy of data;
   store a working copy of the master copy at a second electronic node;
   store a twin copy of the working copy at the second electronic node;
   modify at least a portion of the working copy;
   store the twin copy responsive to the step of modifying the working copy;
   determine a difference between the fetched master copy and the stored twin copy;
   write the determined difference to the working copy; and
   write the determined difference to the twin copy.

8. The method of claim 1, wherein the modification of the at least a first portion of the group of data is preceded by a write instruction.

9. A method for maintaining coherence of data within a shared memory network, comprising the steps of:
   providing a master copy of a group of data at a first node of the network;
   storing a working copy of at least a first portion of the master copy at a second node of the network;

storing a twin copy of the working copy at the second node of the network, the twin copy being created when the working copy has been modified;

fetching the master copy of the group of data from the first node of the network;

determining a difference between the fetched master copy of the group of data and the stored twin copy of the group of data;

writing the determined difference to the working copy and writing the determined difference to the twin copy.

10. The method of claim 9, wherein the twin copy is created upon detection of a write instruction with respect to the working copy of data.

11. The method of claim 9, further comprising the step of detecting initiation of a fetch operation of the master copy of data.

12. The method of claim 11, further comprising the step of modifying the working copy of data;

wherein the step of storing the twin copy includes the step of storing the twin copy responsive to the step of modifying the working copy.

13. The method of claim 9, wherein the difference determination step further comprises the step of performing a bit by bit comparison of the master copy of the group of data to a twin copy of data using an exclusive-OR operation.

* * * * *

UNITED STATES PATENT AND TRADEMARK OFFICE
CERTIFICATE OF CORRECTION

PATENT NO.      : 6,341,339 B1
DATED           : January 22, 2002
INVENTOR(S)     : Kontothanassis et al.

It is certified that error appears in the above-identified patent and that said Letters Patent is hereby corrected as shown below:

<u>Column 1,</u>
Line 5, please insert the following text after the title of the invention and before the section labeled "BACKGROUND OF THE INVENTION":

-- STATEMENT REGARDING FEDERALLY SPONSORED RESEARCH OR DEVELOPMENT

This invention was made with U.S. government support awarded by the following agencies: National Science Foundation Grant Nos. CCR02466, CCR05594, and CDA01142. The United States has certain rights in this invention. --

Signed and Sealed this

Tenth Day of February, 2004

JON W. DUDAS
*Acting Director of the United States Patent and Trademark Office*